(12) United States Patent
Nishioka

(10) Patent No.: US 10,742,793 B2
(45) Date of Patent: Aug. 11, 2020

(54) BASE STATION DEVICE, TERMINAL DEVICE, AND COMMUNICATION SYSTEM

(71) Applicant: JVC KENWOOD Corporation, Yokohama-shi, Kanagawa (JP)

(72) Inventor: Masamichi Nishioka, Yokohama (JP)

(73) Assignee: JVC KENWOOD CORPORATION, Yokohama-shi (JP)

( * ) Notice: Subject to any disclaimer, the term of this patent is extended or adjusted under 35 U.S.C. 154(b) by 0 days.

(21) Appl. No.: 16/276,970

(22) Filed: Feb. 15, 2019

(65) Prior Publication Data

US 2019/0260869 A1 Aug. 22, 2019

(30) Foreign Application Priority Data

Feb. 20, 2018 (JP) ................................ 2018-027767

(51) Int. Cl.
| | | |
|---|---|---|
| *H04W 4/90* | (2018.01) | |
| *H04W 4/06* | (2009.01) | |
| *H04W 60/04* | (2009.01) | |
| *H04W 88/08* | (2009.01) | |
| *H04M 1/725* | (2006.01) | |
| *H04W 4/029* | (2018.01) | |
| *H04W 88/02* | (2009.01) | |

(52) U.S. Cl.
CPC ....... *H04M 1/72538* (2013.01); *H04W 4/029* (2018.02); *H04W 4/06* (2013.01); *H04W 4/90* (2018.02); *H04W 60/04* (2013.01); *H04W 88/023* (2013.01); *H04W 88/08* (2013.01)

(58) Field of Classification Search
CPC ........... H04M 1/72538; H04W 88/023; H04W 4/029; H04W 88/08; H04W 60/04; H04W 4/06; H04W 4/90
See application file for complete search history.

(56) References Cited

U.S. PATENT DOCUMENTS

| | | | | |
|---|---|---|---|---|
| 5,705,980 A | * | 1/1998 | Shapiro ................ | G08B 25/016 340/539.11 |
| 6,073,004 A | * | 6/2000 | Balachandran ...... | G08B 25/001 455/404.2 |
| 7,058,385 B2 | * | 6/2006 | Lauper .................... | H04M 3/42 455/404.1 |
| 8,183,999 B1 | * | 5/2012 | Giallorenzi .......... | G08B 25/016 340/539.13 |
| 2008/0070546 A1 | * | 3/2008 | Lee ......................... | H04W 4/90 455/404.2 |

FOREIGN PATENT DOCUMENTS

JP 2010-268144 A 11/2010

* cited by examiner

*Primary Examiner* — Julio R Perez
(74) *Attorney, Agent, or Firm* — Brundidge & Stanger, P.C.

(57) ABSTRACT

In a base station device, a receiver receives a normal signal from one terminal device included in one of a plurality of groups each including a plurality of terminal devices. The transmitter transmits the normal signal received by the receiver to the rest of the terminal devices included in the group. When the receiver has received an emergency signal from one terminal device included in one group, the transmitter transmits the emergency signal that has been received by the receiver to the rest of the terminal devices included in the group and terminal devices other than those in the group.

2 Claims, 14 Drawing Sheets

FIG.6

| DISTANCE | TERMINAL DEVICE | GROUP | NOTIFICATION OF EMERGENCY SIGNAL RECEPTION | RECORDING | NOTIFICATION OF INDIVIDUAL ID | NOTIFICATION OF GROUP ID | NOTIFICATION OF INFORMATION REGARDING POSITION |
|---|---|---|---|---|---|---|---|
| d≦Th1 | SECOND TERMINAL DEVICE 10b | A | YES | YES | YES | NO | YES |
| | FIFTH TERMINAL DEVICE 10e | B | YES | YES | YES | YES | YES |
| Th1<d≦Th2 | THIRD TERMINAL DEVICE 10c | A | YES | NO | YES | NO | YES |
| | SIXTH TERMINAL DEVICE 10f | B | YES | NO | YES | YES | YES |
| | SEVENTH TERMINAL DEVICE 10g | C | YES | NO | YES | YES | YES |
| d>Th2 | FOURTH TERMINAL DEVICE 10d | A | YES | NO | YES | NO | NO |
| | EIGHTH TERMINAL DEVICE 10h | C | NO | NO | NO | NO | NO |

BASE STATION DEVICE, TERMINAL DEVICE, AND COMMUNICATION SYSTEM

CROSS-REFERENCE TO RELATED APPLICATION

This application is based upon and claims the benefit of priority from the prior Japanese Patent Application No. 2018-027767, filed on Feb. 20, 2018, the entire contents of which are incorporated herein by reference.

BACKGROUND OF THE INVENTION

1. Field

The present invention relates to a base station device, a terminal device, and a communication system that conduct emergency reporting.

2. Description of the Related Art

A server is known that determines, when receiving a message in case of an emergency or the like, whether or not a wireless communication terminal that has sent the message belongs to an existing group and that creates, when the wireless communication terminal does not belong to any existing group, a group with wireless communication terminals located around the wireless communication terminal (see, for example, Patent Document 1). To wireless communication terminals belonging to a group, the server forwards messages sent from other wireless communication terminals (hereinafter referred to as terminal devices) including the wireless communication terminal that has sent the messages.

[Patent Document 1] Japanese Patent Application Publication No. 2010-268144

In the above technology, in the event of an emergency, communication is performed within a new group that has been created; thus, communication cannot be performed within the original group existed before the creation of the new group. Even in the event of an emergency, communication is desirably performed only within the original group.

SUMMARY OF THE INVENTION

A base station device according to one embodiment of the present embodiment includes: a receiver that receives a normal signal from one terminal device included in one of a plurality of groups each including a plurality of terminal devices; and a transmitter that transmits the normal signal received by the receiver to the rest of the terminal devices included in the group. When the receiver has received an emergency signal from one terminal device included in one group, the transmitter transmits the emergency signal that has been received by the receiver to the rest of the terminal devices included in the group and terminal devices other than those in the group.

Another embodiment of the present embodiment relates to a terminal device. This terminal device includes: a receiver that receives, from one terminal device included in one of a plurality of groups each including a plurality of terminal devices, an emergency signal and group information of this terminal device; a calculation unit that calculates a distance between the present terminal device and the terminal device that is the transmission source for the emergency signal; and a notification unit that gives notification, when the receiver has received the emergency signal, of the reception of the emergency signal when (1) the group of the terminal device that is the transmission source for the emergency signal is the same as the group of the present terminal device or when (2) the group of the terminal device that is the transmission source for the emergency signal is different from the group of the present terminal device and the distance calculated by the calculation unit satisfies a predetermined condition.

Still another embodiment of the present embodiment relates to a communication system. This communication system includes a plurality of terminal devices and a base station device that manages the plurality of terminal devices. The base station device includes: a receiver that receives a normal signal from one terminal device included in one of a plurality of groups each including a plurality of terminal devices; and a transmitter that transmits the normal signal received by the receiver to the rest of the terminal devices included in the group. When the receiver has received an emergency signal from one terminal device included in one group, the transmitter transmits the emergency signal that has been received by the receiver to the rest of the terminal devices included in the group and terminal devices other than those in the group.

Optional combinations of the aforementioned constituting elements and implementations of embodiments in the form of methods, apparatuses, systems, recording mediums, computer programs, and the like may also be practiced as additional modes of the embodiments.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which:

FIG. 6 is a diagram illustrating the operation of a second terminal device through the operation of an eighth terminal device when a first terminal device of FIG. 1 transmits an emergency signal;

DETAILED DESCRIPTION OF THE PREFERRED EMBODIMENT

Figure 1:
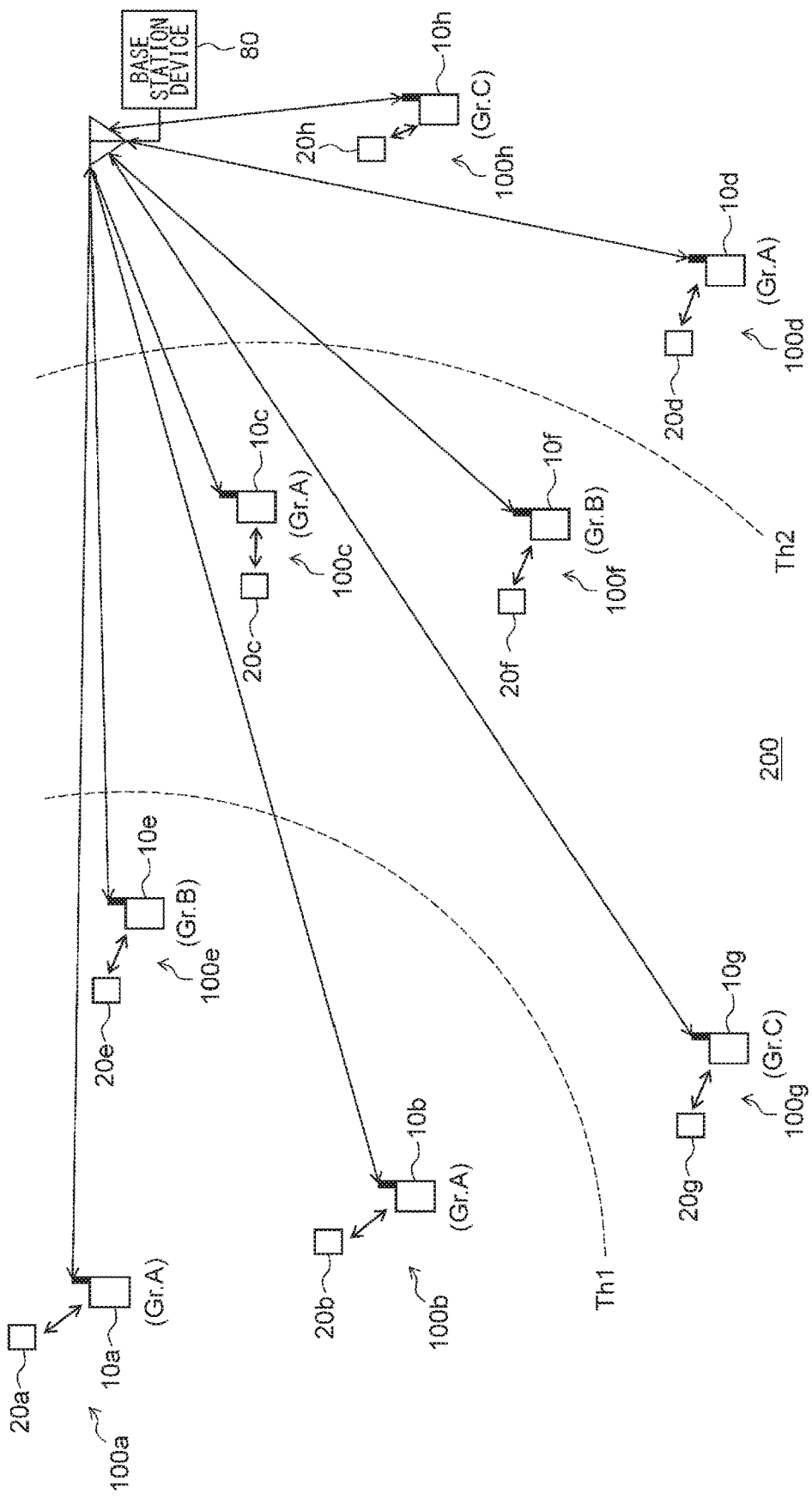
FIG. 1 is a diagram illustrating the configuration of a communication system according to a first embodiment.

The invention will now be described by reference to the preferred embodiments. This does not intend to limit the scope of the present invention, but to exemplify the invention.

Before explaining an embodiment in detail, an overview will be given. The embodiment relates to a business wireless system including a plurality of terminal devices, a plurality of cameras, and a base station device. A terminal device and a camera that are a pair are connected to each other wirelessly or by wires and are paired. The paired terminal device and camera are mainly carried by a user such as a police officer and a security guard. The camera is also called a wearable camera and is worn by the user. In the camera, start and stop of recording are controlled by the paired terminal device.

In the business wireless system, a plurality of groups each including a plurality of terminal devices are formed. A base station device allocates an uplink channel and a downlink channel to the groups. In this kind of situation, one of the terminal devices in a group transmits a normal signal through the uplink channel, and the rest of the terminal devices in the group receive the normal signal through the downlink channel. The normal signal includes call data, etc. Further, the same process is performed on another group. However, communication of a normal signal is not performed between different groups.

A business wireless system is provided with an emergency reporting (emergency) function. This is a function where a terminal device conducts emergency reporting to another terminal device via the base station device when it is necessary to make contact urgently. Since the emergency reporting is transmitted as data, the transmission is completed in a short time and does not occupy the communication line. When a button for the emergency reporting is pressed down by the user, the terminal device transmits an emergency signal and causes the paired camera to start recording. Further, instead of using the button for emergency reporting, when the user collapses, the collapsing may be detected by a sensor built in the terminal device, an emergency signal may be transmitted, and the recording may be started by the paired camera, as well. The user presses down the button for emergency reporting, e.g., when tracking a person to be tracked. Video that is recorded can be used as evidence etc. A terminal device in a standby state excluding the terminal device that is transmitting the emergency signal reports the occurrence of an emergency situation by sound or display when receiving the emergency signal. The user who is informed of the occurrence of the emergency situation can head to help the user who made the emergency reporting.

Even if a user located relatively close to the user who made the emergency reporting has a terminal device of a group different from that of the terminal device of the user who made the emergency reporting, there are cases where the user preferably heads to help. Accordingly, emergency reporting is also desirably made to such a terminal device of a different group. However, there is a possibility of inconvenience if communication cannot be performed within an existing group at the time of an emergency. In other words, as described above, it is desirable to be able to make emergency reporting to a terminal device regardless of a group at the time of an emergency and to be able to perform communication within the group. Therefore, in the embodiment, when receiving an emergency signal from one terminal device included in one group, the base station device transmits the emergency signal that has been received to the rest of the terminal devices included in the group and terminal devices other than those in the group while maintaining the groups.

FIG. 1 is a diagram illustrating the configuration of a communication system 200 according to the first embodiment. The communication system 200 includes a first camera system 100a, a second camera system 100b, a third camera system 100c, a fourth camera system 100d, a fifth camera system 100e, a sixth camera system 100f, a seventh camera system 100g, and an eighth camera system 100h, which are generically referred to as camera systems 100. The number of the camera systems 100 is not limited to "8". Further, the communication system 200 includes a base station device 80.

The first camera system 100a includes a first terminal device 10a and a first camera 20a. The second camera system 100b includes a second terminal device 10b and a second camera 20b. The third camera system 100c includes a third terminal device 10c and a third camera 20c. The fourth camera system 100d includes a fourth terminal device 10d and a fourth camera 20d. The fifth camera system 100e includes a fifth terminal device 10e and a fifth camera 20e. The sixth camera system 100f includes a sixth terminal device 10f and a sixth camera 20f. The seventh camera system 100g includes a seventh terminal device 10g and a seventh camera 20g. The eighth camera system 100h includes an eighth terminal device 10h and an eighth camera 20h.

The first terminal device 10a, the second terminal device 10b, the third terminal device 10c, the fourth terminal device 10d, the fifth terminal device 10e, the sixth terminal device 10f, the seventh terminal device 10g, and the eighth terminal device 10h are generically referred to as terminal devices 10. The first camera 20a, the second camera 20b, the third camera 20c, the fourth camera 20d, the fifth camera 20e, the sixth camera 20f, the seventh camera 20g, and the eighth camera 20h are generically referred to as cameras 20.

The first terminal device 10a and the first camera 20a are paired and carried by the first user. The second terminal device 10b and the second camera 20b are paired and carried by the second user. The third terminal device 10c and the third camera 20c are paired and carried by the third user. The fourth terminal device 10d and the fourth camera 20d are paired and carried by the fourth user. The fifth terminal device 10e and the fifth camera 20e are paired and carried by the fifth user. The sixth terminal device 10f and the sixth camera 20f are paired and carried by the sixth user. The seventh terminal device 10g and the seventh camera 20g are paired and carried by the seventh user. The eighth terminal device 10h and the eighth camera 20h are paired and carried by the eighth user. As described, a terminal device 10 and a camera 20 carried by the same user are paired and connected wirelessly. A terminal device 10 and a camera 20 that are paired may be connected by wire.

The cameras 20 are capable of recording. In the camera 20, start and stop of recording are controlled by the user or by the paired terminal device 10.

FIG. 1 shows the positional relationship of a plurality of terminal devices 10. For example, the linear distance between the first terminal device 10a and the second terminal device 10b is shorter than the linear distance between the first terminal device 10a and the third terminal device 10c. The linear distance between the first terminal device 10a and the third terminal device 10c is shorter than the linear distance between the first terminal device 10a and the fourth terminal device 10d.

In FIG. 1, the first terminal device 10a, the second terminal device 10b, the third terminal device 10c, and the fourth terminal device 10d form a group. This group is called group A. The fifth terminal device 10e and the sixth terminal device 10f form a group. This group is called group B. The seventh terminal device 10g and the eighth terminal device 10h form a group. This group is called group C. The number of terminal devices 10 included in one group is not limited to "2" or "4". The number of groups is not limited to "3". As described, the plurality of groups each include a plurality of terminal devices 10.

One terminal device 10 included in one of the plurality of groups is a wireless terminal capable of performing communication by business radio with the rest of the terminal devices 10 included in the group via the base station device 80. This communication may be a call or data communication. For the business radio, well-known techniques may be used, and a detailed description thereof will be therefore omitted.

The base station device 80 manages a plurality of terminal devices 10. The base station device 80 allocates an uplink channel and a downlink channel to each group. In this kind of situation, one of the terminal devices 10 in a group transmits a normal signal through the uplink channel, and the rest of the terminal devices 10 in the group receive the normal signal through the downlink channel.

Figure 2:
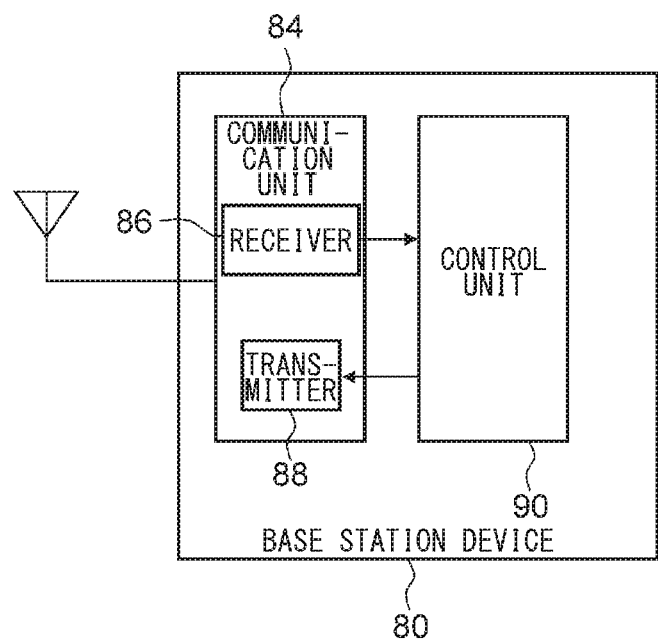
FIG. 2 is a block diagram illustrating the configuration of a base station device of FIG. 1.

FIG. 2 is a block diagram showing the configuration of the base station device 80 of FIG. 1. The base station device 80 includes a communication unit 84 and a control unit 90. The communication unit 84 includes a receiver 86 and a transmitter 88 and performs communication by the business radio with the plurality of terminal devices 10. The control unit 90 controls the communication unit 84.

The receiver 86 receives a normal signal from one terminal device 10 included in one of the plurality of groups through an uplink channel assigned to the group. When the receiver 86 has received the normal signal, the control unit 90 causes the transmitter 88 to transmit the normal signal. The transmitter 88 transmits the normal signal received by the receiver 86 to the rest of the terminal devices 10 included in the group through the downlink channel assigned to the group.

Figures 3A, 3B:
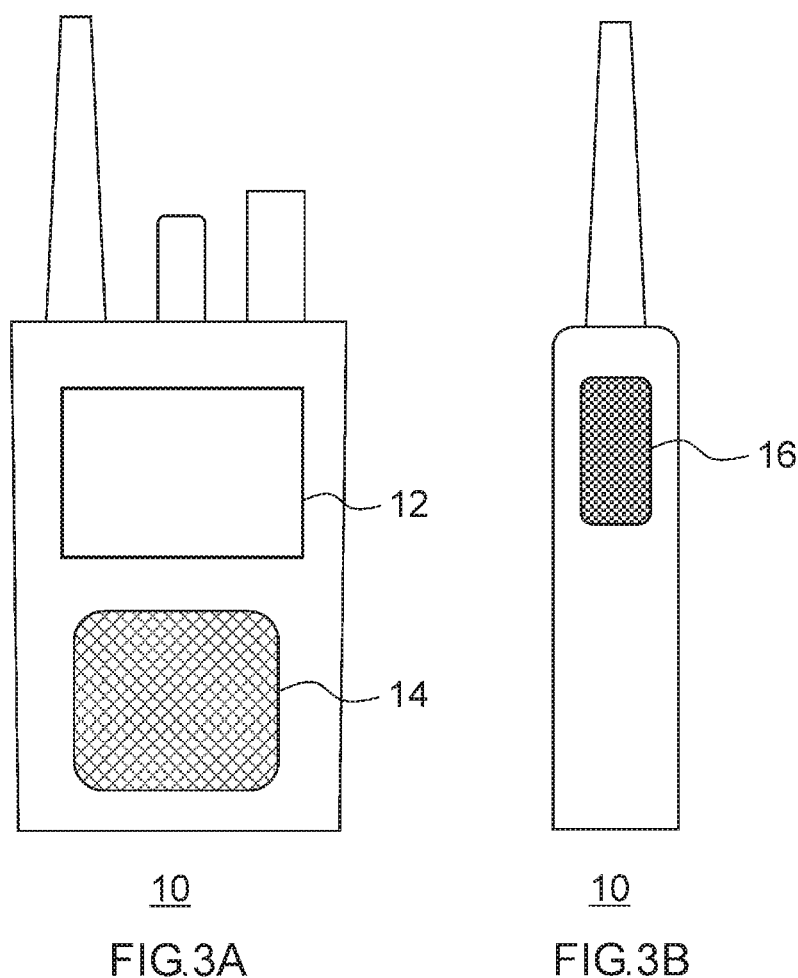
FIG. 3A is a front view of a terminal device of FIG. 1.
FIG. 3B is a lateral view of the terminal device of FIG. 1.

FIG. 3A is a front view of the terminal device 10 of FIG. 1, and FIG. 3B is a lateral view of the terminal device 10 of FIG. 1. The terminal device 10 includes a display unit 12 and a speaker 14 on the front side and an emergency button 16 for reporting an emergency on a side surface. The display unit 12 displays various types of information. The speaker 14 outputs sound, notification sound, and the like. The emergency button 16 is pressed down by the user when an emergency situation occurs and is pressed down again when the emergency situation has ended. Further, instead of using the emergency button 16, when the user collapses, the collapsing may be detected by a sensor built in the terminal device 10, an emergency signal may be transmitted, and the recording may be started by a camera 20 that has been paired, as well. The appearance of the terminal device 10 is not limited to the example in FIGS. 3A and 3B.

Figure 4:
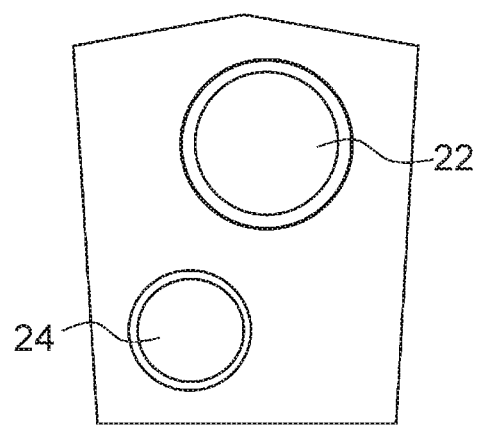
FIG. 4 is a front view of a camera of FIG. 1.

FIG. 4 is a front view of a camera 20 of FIG. 1. The camera 20 includes a lens 22 and a recording button 24 on the front. The lens 22 allows image light to be incident on an image capturing unit, which will be described later. The recording button 24 is used for manual operation and is pressed down by the user when starting the recording and pressed down again when stopping the recording. The appearance of the camera 20 is not limited to the example in FIG. 4.

Figure 5:
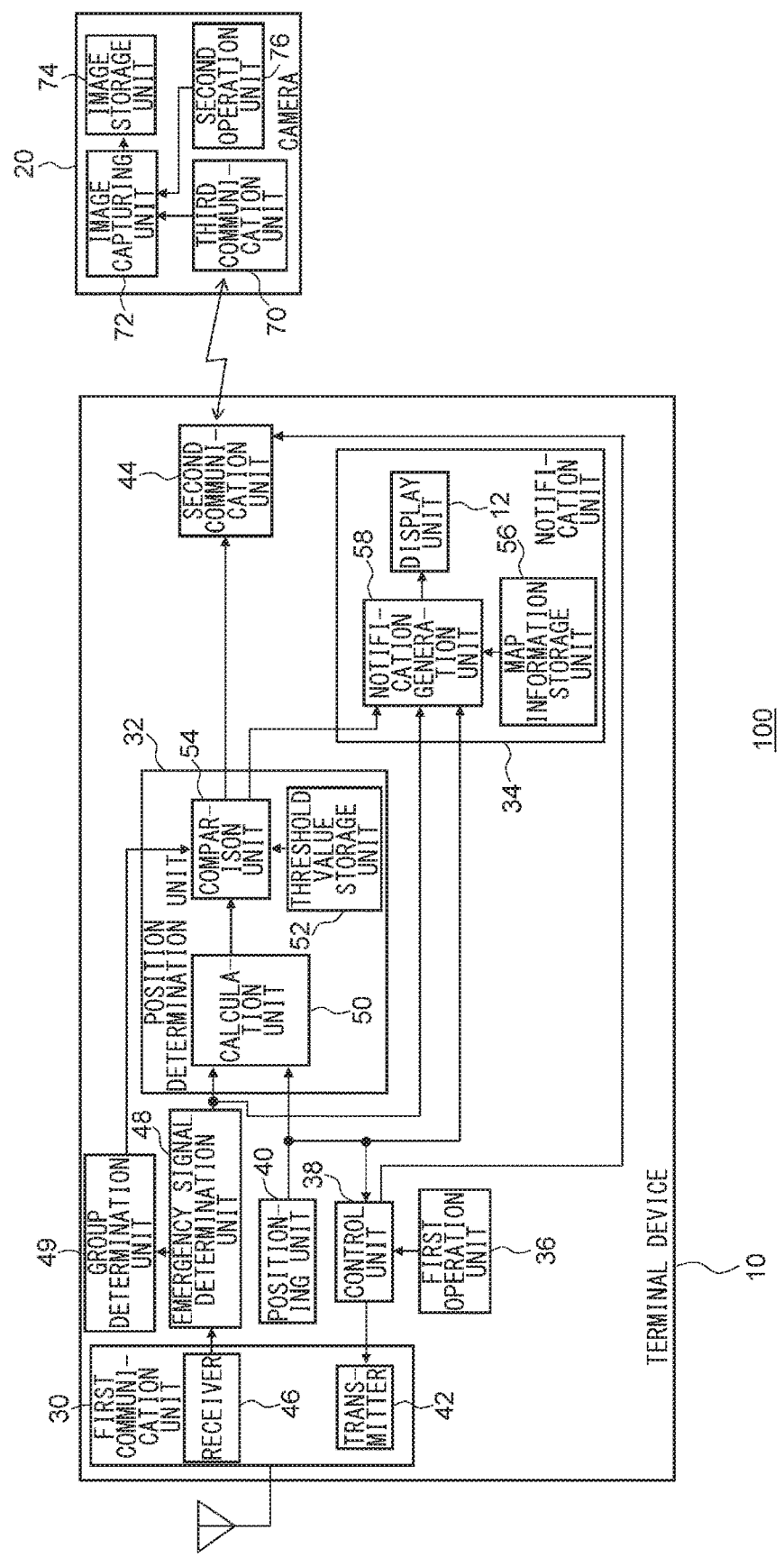
FIG. 5 is a block diagram illustrating the configuration of a camera system of FIG. 1.

FIG. 5 is a block diagram illustrating the configuration of a camera system 100 of FIG. 1. The terminal device 10 includes a first communication unit 30, a position determination unit 32, a notification unit 34, a first operation unit 36, a control unit 38, a positioning unit 40, a second communication unit 44, an emergency signal determination unit 48, and a group determination unit 49. The first communication unit 30 includes a transmitter 42 and a receiver 46 and performs communication by business radio. The position determination unit 32 includes a calculation unit 50, a threshold value storage unit 52, and a comparison unit 54. The notification unit 34 includes a display unit 12, a map information storage unit 56, and a notification generation unit 58. In order to clarify the explanation, the configuration related to the call in the terminal device 10 is not shown. The camera 20 includes a third communication unit 70, an image capturing unit 72, an image storage unit 74, and a second operation unit 76. The first terminal device 10a through the eighth terminal device 10h shown in FIG. 1 share the same configuration, and the first camera 20a through the eighth camera 20h share the same configuration.

In order to clarify the explanation, an explanation will be given in the following order in accordance with processes performed at the time of reporting an emergency: (1) processes by the terminal device 10 for transmitting the emergency signal, (2) processes by the base station device 80, and (3) processes by the terminal device 10 for receiving the emergency signal.

(1) Processes by the Terminal Device 10 for Transmitting the Emergency Signal

In this case, the terminal device 10 corresponds to the first terminal device 10a in FIG. 1, and the camera 20 corresponds to the first camera 20a. In FIG. 5, the first operation unit 36 includes the emergency button 16 in FIG. 3 and outputs an instruction to report an emergency to the control unit 38 when the emergency button 16 is pressed down. This instruction to report an emergency is valid until the emergency button 16 is pressed down next time.

The positioning unit 40 has a positioning function of a global positioning system (GPS), measures the position of the terminal device 10, and regularly acquires position information, which is the result of the measurement of the position. The position information is indicated by latitude and longitude. The position information may include altitude information. The positioning unit 40 outputs the position information to the control unit 38, the calculation unit 50, and the notification generation unit 58.

When an instruction to report an emergency is output from the first operation unit 36, the control unit 38 causes the transmitter 42 to transmit an emergency signal, the position information of the terminal device 10, the individual ID of the terminal device 10, and the group ID of the terminal device 10 to the base station device 80. In other words, the terminal device 10 transmits the emergency signal, the position information, the individual ID, and the group ID to the base station device 80. The individual ID corresponds to identification information for identifying the terminal device 10 that is the transmission source for the emergency signal. The group ID corresponds to the group information indicating the group in which the terminal device 10 that is the transmission source for the emergency signal is included. The emergency signal or the like is transmitted through the uplink channel assigned to the group of the terminal device 10. The emergency signal or the like may be transmitted through the same channel as the uplink channel used for a call or may be transmitted through a different channel.

When the outputting of the instruction to report an emergency from the first operation unit 36 is stopped, the control unit 38 causes the transmitter 42 to stop transmitting the emergency signal, the position information, the individual ID, and the group ID. After the emergency button 16 is pressed down, the emergency signal, the individual ID, and the group ID are continuously transmitted and the position information is periodically transmitted until the emergency button 16 is pressed down again. The position information may be periodically transmitted irrespective of any operation on the emergency button 16.

Further, when an instruction to report an emergency is output from the first operation unit 36, the control unit 38 causes the paired camera 20 to start recording. Specifically, the control unit 38 outputs an instruction to start recording to the second communication unit 44. The second communication unit 44 transmits the instruction to start recording to the third communication unit 70 of the camera 20. The second communication unit 44 and the third communication unit 70 perform short-range wireless communication, for example, Bluetooth (registered trademark) communication. The third communication unit 70 outputs an instruction to record to the image capturing unit 72. The image capturing unit 72 captures a moving image in accordance with the instruction to record and outputs captured image data to the image storage unit 74. The image storage unit 74 stores the captured image data. When the outputting of the instruction to report an emergency from the first operation unit 36 is stopped, the control unit 38 stops the outputting of the instruction to record and causes the paired camera 20 to stop recording.

(2) Processes by the Base Station Device 80

In the base station device 80 in FIG. 2, the receiver 86 receives the emergency signal, the position information, the individual ID, and the group ID from the terminal device 10, that is, the first terminal device 10a in FIG. 1. When the receiver 86 has received an emergency signal or the like, the control unit 90 causes the transmitter 88 to transmit the emergency signal or the like.

When the receiver 86 has received an emergency signal, position information, an individual ID, and a group ID from one terminal device 10 included in one group, the transmitter 88 transmits the emergency signal, the position information, the individual ID, and the group ID received by the receiver 86 to the rest of the terminal devices 10 included in the group and to terminal devices 10 other than those in the group while maintaining the groups. That is, without changing the existing group, the transmitter 88 transmits the emergency signal or the like to terminal devices 10 other than the terminal device 10 that is the transmission source for the emergency signal, among the plurality of terminal devices 10 in the coverage area of the base station device 80. In the example of FIG. 1, the transmitter 88 transmits an emergency signal or the like from the second terminal device 10b to the eighth terminal device 10h while maintaining the group A through the group C. The emergency signal or the like is transmitted through the downlink channel assigned to each group. The emergency signal or the like may be transmitted through the same channel as the downlink channel used for a call or may be transmitted through a different channel.

Since the groups are maintained, even when the receiver 86 receives, while the terminal device 10 is transmitting an emergency signal, a normal signal from one terminal device 10 included in one group, the transmitter 88 can transmit the normal signal received by the receiver 86 to the rest of the terminal devices 10 included in the group. Therefore, even when the terminal device 10 is in the middle of transmitting the emergency signal, group communication can be performed using the same groups as those before the transmission of the emergency signal.

(3) Processes by the Terminal Device 10 for Receiving the Emergency Signal

In this case, the terminal device 10 corresponds to each of the second terminal device 10b through the eighth terminal device 10h in FIG. 1, and the camera 20 corresponds to each of the second camera 20b through the eighth camera 20h.

In FIG. 5, the receiver 46 receives a reception signal from another terminal device 10 via the base station device 80 through the downlink channel assigned to the group of the present terminal device 10. Here, "another terminal device (or the other terminal device)" used here means the first terminal device 10a in FIG. 1, which is the transmission source for the emergency signal. The reception signal includes the emergency signal, the position information of the other terminal device 10, the individual ID of the other terminal device 10, and the group ID of the other terminal device 10. The receiver 46 outputs the reception signal to the emergency signal determination unit 48.

The emergency signal determination unit 48 determines whether or not the emergency signal has been received based on the reception signal. When the emergency signal is received, the emergency signal determination unit 48 outputs information indicating that the emergency signal has been received and the position information of the other terminal device 10 included in the reception signal to the calculation unit 50 and the notification generation unit 58 and outputs the individual ID of the other terminal device 10 included in the reception signal to the notification generation unit 58. Further, when the emergency signal is received, the emergency signal determination unit 48 outputs the group ID of the other terminal device 10 included in the reception signal to the group determination unit 49. When the emergency signal is not received, the emergency signal determination unit 48 does not output such information.

Based on the group ID output from the emergency signal determination unit 48, the group determination unit 49 determines whether or not the group of the other terminal device 10 is the same as the group of the present terminal device 10. The group determination unit 49 outputs the determination result to the comparison unit 54.

The positioning unit 40 measures the position of the present terminal device 10 and regularly acquires position information, which is the result of the measurement of the position. The positioning unit 40 outputs the position information to the control unit 38, the calculation unit 50, and the notification generation unit 58.

When the receiver 46 has received the emergency signal, the calculation unit 50 calculates the distance d between the present terminal device 10 and the other terminal device 10 based on the position information of the present terminal device 10 and the position information of the other terminal device 10. The distance d is a straight line distance and can be calculated using, for example, the Pythagorean theorem. In the case of using the Pythagorean theorem, position coordinates (a, b) are derived from the position information of the other terminal device 10, position coordinates (c, d) are derived from the position information of the present terminal device 10, and the calculation is performed as follows: $d=\sqrt{[(c-a)^2+(d-b)^2]}$.

The threshold value storage unit 52 is composed of a memory or the like and stores a predetermined recording start threshold value Th1 and a predetermined notification threshold value Th2. The notification threshold value Th2 is larger than the recording start threshold value Th1. The recording start threshold value Th1 and the notification threshold value Th2 are preset by computer simulation, experiment, or the like. In the example in FIG. 1, the distance d between the first terminal device 10*a* and the second terminal device 10*b* and the distance d between the first terminal device 10*a* and the fifth terminal device 10*e* are smaller than the recording start threshold value Th1. The distance d between the first terminal device 10*a* and the third terminal device 10*c*, the distance d between the first terminal device 10*a* and the sixth terminal device 10*f*, and the distance d between the first terminal device 10*a* and the seventh terminal device 10*g* are larger than the recording start threshold value Th1 and are smaller than the notification threshold value Th2. The distance d between the first terminal device 10*a* and the fourth terminal device 10*d* and the distance d between the first terminal device 10*a* and the eighth terminal device 10*h* are larger than the notification threshold value Th2.

The comparison unit 54 compares the distance d between the present terminal device 10 and the other terminal device 10 calculated by the calculation unit 50, the recording start threshold value Th1, and the notification threshold value Th2 with one another.

As shown in FIG. 6, the present terminal device 10 operates in accordance with the comparison result by the comparison unit 54 and whether or not the group of other terminal device 10 is the same as the group of the present terminal device 10. FIG. 6 is a diagram illustrating the operation of the second terminal device 10*b* through the operation of the eighth terminal device 10*h* when the first terminal device 10*a* of FIG. 1 transmits an emergency signal. Hereinafter, an explanation will be made with reference to FIG. 6 as appropriate.

When the receiver 46 receives the emergency signal and the distance d is less than or equal to the recording start threshold value Th1, the comparison unit 54 causes a camera 20 that is carried by the user along with the present terminal device 10, i.e., the paired camera 20 to start recording, regardless of the group of the other terminal device 10. More specifically, the comparison unit 54 outputs an instruction to record to the second communication unit 44. The second communication unit 44 transmits the instruction to record to the third communication unit 70 of the camera 20. The third communication unit 70 outputs the instruction to record to the image capturing unit 72. The image capturing unit 72 captures a moving image in accordance with the instruction to record and outputs captured image data to the image storage unit 74. The image storage unit 74 stores the captured image data. Such operation is performed by the second terminal device 10*b*, the second camera 20*b*, the fifth terminal device 10*e*, and the fifth camera 20*e* of FIG. 1 as shown in FIG. 6.

When the receiver 46 receives the emergency signal and the distance d is less than or equal to the notification threshold value Th2, the comparison unit 54 causes the notification unit 34 to notify the information regarding the position of the other terminal device 10, regardless of the group of the other terminal device 10. More specifically, the comparison unit 54 outputs an instruction to notify the position to the notification unit 34. In response to the instruction to notify the position, the notification unit 34 notifies the user of the present terminal device 10 of the information regarding the position of the other terminal device 10 based on the position information of the present terminal device 10 and the position information of the other terminal device 10. The information regarding the position of the other terminal device 10 includes, for example, the latitude and longitude of the other terminal device 10, the distance d, the direction of the other terminal device 10, the altitude difference from the other terminal device 10, and a path to the other terminal device 10. Such notification is made by the second terminal device 10*b*, the third terminal device 10*c*, the fifth terminal device 10*e*, the sixth terminal device 10*f*, and the seventh terminal device 10*g* of FIG. 1 as shown in FIG. 6.

When the receiver 46 receives the emergency signal, the comparison unit 54 causes the notification unit 34 to notify information for identifying the other terminal device 10 and the reception of the emergency signal when (1) the group of the other terminal device 10 is the same as the group of the present terminal device 10 or when (2) the group of the other terminal device 10 is different from the group of the present terminal device 10 and the distance d satisfies a predetermined condition. Here, the predetermined condition is the distance being less than or equal to the notification threshold value Th2. Such notification is made by the second terminal device 10*b*, the third terminal device 10*c*, the fourth terminal device 10*d*, the fifth terminal device 10*e*, the sixth terminal device 10*f*, and the seventh terminal device 10*g* of FIG. 1 as shown in FIG. 6.

In the case where the comparison unit 54 causes the notification unit 34 to notify the reception of the emergency signal, if the group of the other terminal device 10 is different from the group of the present terminal device 10, the comparison unit 54 causes the notification unit 34 to give notification of the group of the other terminal device 10. In other words, in the case where the notification unit 34 gives notification of the reception of the emergency signal, when the group of the other terminal device 10 is different from the group of the present terminal device 10, the notification unit 34 gives notification of the group of the other terminal device 10. Such notification is made by the fifth terminal device 10*e*, the sixth terminal device 10*f*, and the seventh terminal device 10*g* of FIG. 1 as shown in FIG. 6.

The notification of information by the notification unit 34 is made, for example, as follows. The map information storage unit 56 stores map information. The notification generation unit 58 generates map data based on the map information stored in the map information storage unit 56, the position information of the present terminal device 10, and the position information of the other terminal devices 10. The map data includes the distance d, the direction of the other terminal device 10, the altitude difference from the other terminal device 10, and a path from the position of the present terminal device 10 to the position of the other terminal device 10. Further, the notification generation unit 58 generates information for identifying the other terminal device 10 based on the individual ID, generates information regarding the group of the other terminal device 10 based on the group ID, and includes these pieces of information in the map data. The information for identifying the other terminal device 10 may be the same as the individual ID. The information regarding the group of the other terminal device 10 may be the same as the group ID. The notification generation unit 58 outputs the map data that has been generated to the display unit 12. The display unit 12 displays a map in which various types of information is included based on the map data.

Instead of displaying the map, the notification unit 34 may display the direction of the other terminal device 10 on the display unit 12 using arrows and letters and display the position and distance of the other terminal device 10, the information for identifying the other terminal device 10, the information regarding the group of the other terminal device 10, and the reception of the emergency signal on the display unit 12 using letters. Further, the notification unit 34 may cause the speaker 14 to output these pieces of information by voice.

Figure 7:
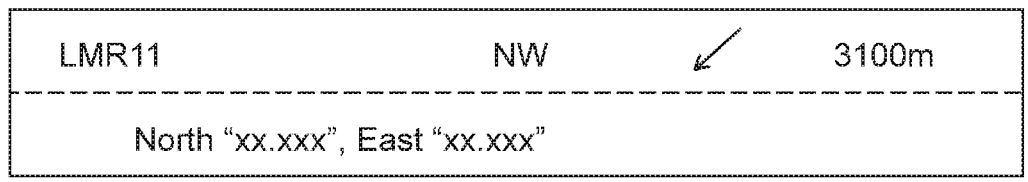
FIG. 7 is a diagram illustrating an example of information displayed on a display unit of FIG. 5 when an emergency signal is received from another terminal device in the same group.

FIG. 7 is a diagram illustrating an example of information displayed on the display unit 12 of FIG. 5 when an emergency signal is received from another terminal device 10 in the same group. The display unit 12 displays the letters "LMR11" being information for identifying the other terminal device 10, the letters "NW" indicating the direction (cardinal direction) of the other terminal device 10, the arrow indicating the direction of the other terminal device 10, and the letters "3100 m" indicating the distance. Further, the display unit 12 displays the letters 'North "xx.xxx"', East "xx.xxx"' indicating the position of the other terminal device 10, that is, the latitude and the longitude.

Figure 8:
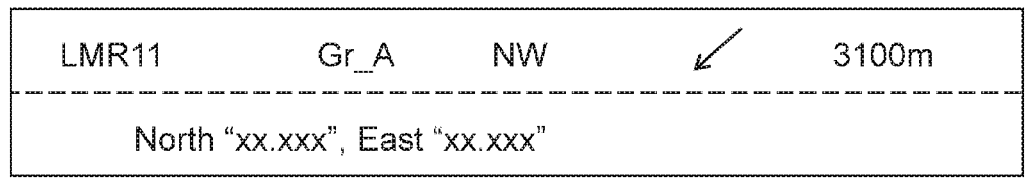
FIG. 8 is a diagram illustrating an example of information displayed on the display unit of FIG. 5 when an emergency signal is received from another terminal device in a different group.

FIG. 8 is a diagram illustrating an example of information displayed on the display unit 12 of FIG. 5 when an emergency signal is received from another terminal device 10 in a different group. In addition to the information according to FIG. 7, the display unit 12 displays the letters "Gr_A" being information regarding the group of the other terminal device 10.

FIG. 5 is referred back. When the distance d is larger than the recording start threshold value Th1, the comparison unit 54 stops the outputting of the instruction to record such that the camera 20 does not perform the recording. When the distance d is larger than the notification threshold value Th2, the comparison unit 54 stops the outputting of the instruction to notify the position such that the notification unit 34 does not notify the information regarding the position of the other terminal device 10.

When the receiver 46 has received the emergency signal, the comparison unit 54 causes the notification unit 34 not to notify information for identifying the other terminal device 10 and the reception of the emergency signal if the group of the other terminal device 10 is different from the group of the present terminal device 10 and the distance d does not satisfy the predetermined condition.

In the case where the comparison unit 54 causes the notification unit 34 to notify the reception of the emergency signal, if the group of the other terminal device 10 is the same as the group of the present terminal device 10, the comparison unit 54 causes the notification unit 34 to not notify the group of the other terminal device 10.

Further, when the receiver 46 has not received the emergency signal, the notification unit 34 do not notify the information for identifying the other terminal device 10, the information regarding the group of the other terminal device, and the reception of the emergency signal. Further, when the receiver 46 has not received the emergency signal, the comparison unit 54 stops the outputting of the instruction to record such that the camera 20 does not perform the recording and stops the outputting of the instruction to notify the position such that the notification unit 34 does not notify the information regarding the position of the other terminal device 10.

If the recording button 24 of FIG. 4 included in the second operation unit 76 of the camera 20 is pressed down by the user when the terminal device 10 is not transmitting or receiving an emergency signal, the image capturing unit 72 captures a moving image, and the image storage unit 74 stores the captured image data. In other words, the recording can be also done manually.

The configuration is implemented in hardware by any CPU of a computer, memory or other LSI's, and in software by a program or the like loaded into the memory. The figure depicts functional blocks implemented by the cooperation of hardware and software. Thus, a person skilled in the art should appreciate that there are many ways of accomplishing these functional blocks in various forms in accordance with the components of hardware only, software only, or the combination of both.

Figure 9:
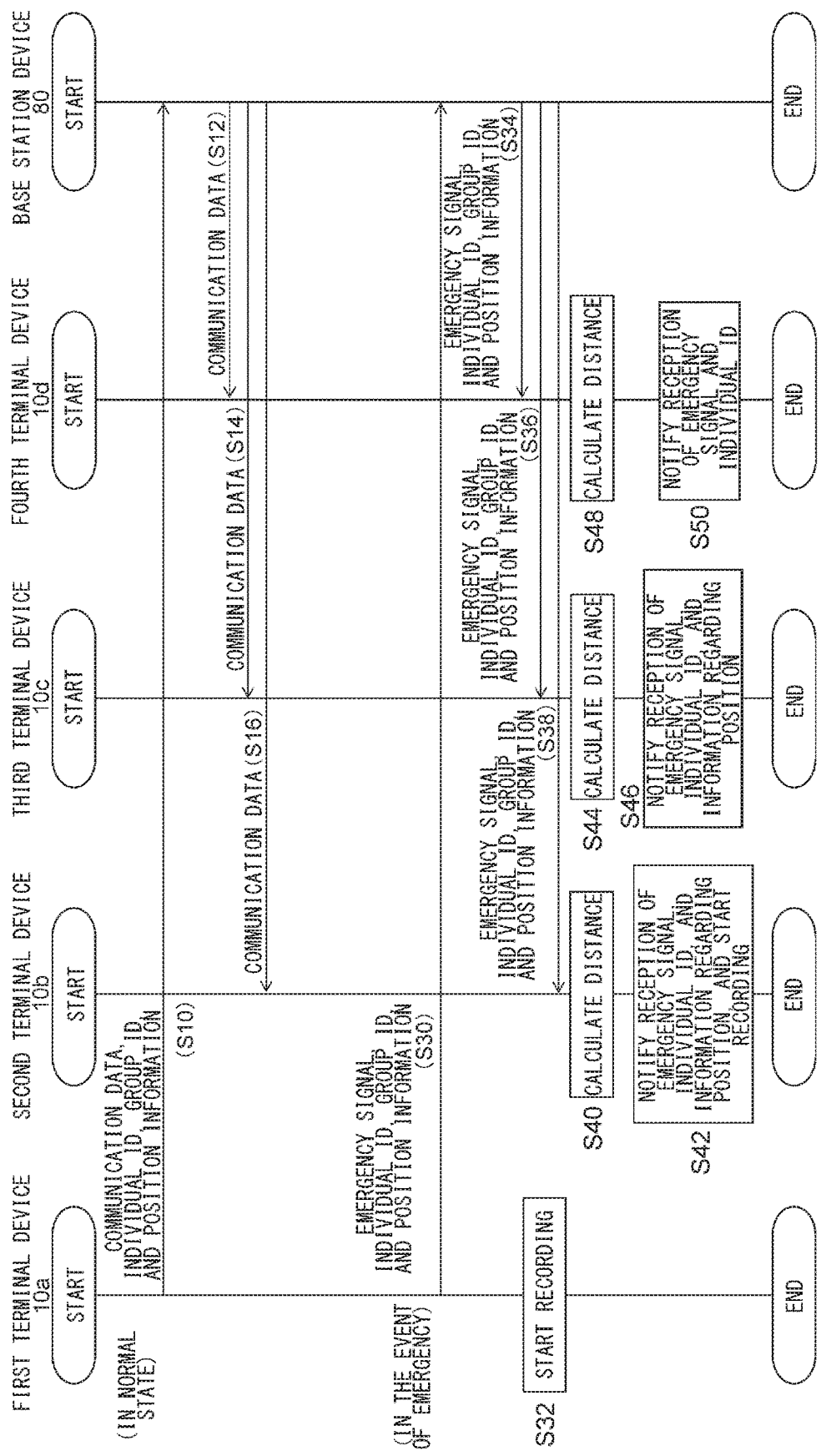
FIG. 9 is a sequence diagram illustrating processes of the first terminal device through the fourth terminal device and the base station device of FIG. 1.
Figure 10:
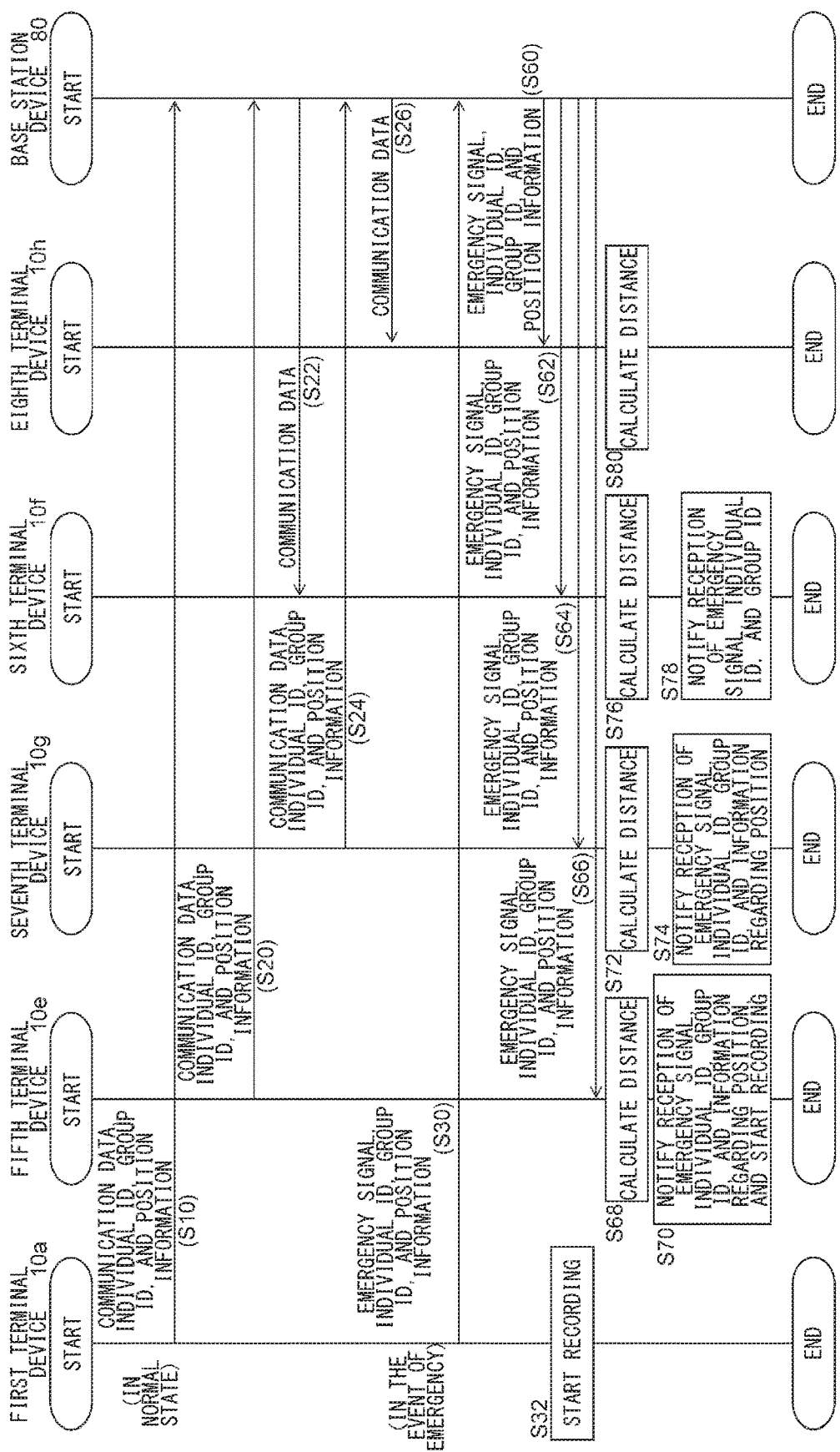
FIG. 10 is a sequence diagram illustrating the processes of the fifth terminal device through the eighth terminal device and the base station device of FIG. 1.

An explanation will be given of the operation of the communication system 200 having the above-stated structure. FIG. 9 is a sequence diagram illustrating processes of the first terminal device 10*a* through the fourth terminal device 10*d* and the base station device 80 of FIG. 1. FIG. 10 is a sequence diagram illustrating processes of the fifth terminal device 10*e* through the eighth terminal device 10*h* and the base station device 80 of FIG. 1. The processes in FIG. 9 and FIG. 10 are started at the same point in time. In FIG. 10, processes of the first terminal device 10*a* are also shown in order to clarify the explanation, which are the same as those of FIG. 9.

As shown in FIG. 9, in a normal state, that is, when the emergency button 16 is not being pressed down, for example, the first terminal device 10*a* transmits a normal signal, the individual ID, the group ID, and the position information to the base station device 80 (S10). The base station device 80 transmits the normal signal that has been received to the fourth terminal device 10*d* of the same group (S12), to the third terminal device 10*c* (S14), and to the second terminal device 10*b* (S16). The processes from S12 to S16 can be performed substantially simultaneously.

As shown in FIG. 10, the base station device 80 having received the normal signal or the like transmitted in step S10 does not transmit the normal signal to the fifth terminal device 10*e* through the eighth terminal device 10*h*, which are in a different group. In this manner, group communication is performed among the first terminal device 10*a* through the fourth terminal device 10*d* in the group A.

Further, for example, the fifth terminal device 10*e* transmits a normal signal or the like to the base station device 80 (S20). The base station device 80 transmits the normal signal that has been received to the sixth terminal device 10*f* of the same group (S22). In this manner, group communication is performed in the fifth terminal device 10*e* and the sixth terminal device 10*f* in the group B.

Further, for example, the seventh terminal device 10*g* transmits a normal signal or the like to the base station device 80 (S24). The base station device 80 transmits the normal signal that has been received to the eighth terminal device 10*h* of the same group (S26). In this manner, group communication is performed in the seventh terminal device 10*g* and the eighth terminal device 10*h* in the group C.

As shown in FIG. 9, in the event of an emergency, that is, for example, when the emergency button 16 of the first terminal device 10*a* is pressed down, the first terminal device 10*a* transmits an emergency signal, the individual ID, the group ID, and the position information to the base station device 80 (S30). The first terminal device 10*a* causes the first camera 20*a* to start recording (S32). The base station device 80 transmits the emergency signal, the individual ID, the group ID, and the position information that have been received to the fourth terminal device 10d (S34), to the third terminal device 10c (S36), and to the second terminal device 10b (S38).

The second terminal device 10b calculates the distance (S40), notifies the reception of the emergency signal, the individual ID, and the information regarding the position, and causes the second camera 20b to start recording (S42). The third terminal device 10c calculates the distance (S44) and notifies the reception of the emergency signal, the individual ID, and the information regarding the position (S46). The fourth terminal device 10d calculates the distance (S48) and notifies the reception of the emergency signal and the individual ID (S50).

Further, as shown in FIG. 10, the base station device 80 that has received the emergency signal or the like transmits the emergency signal, the individual ID, the group ID, and the position information that have been received to the eighth terminal device 10h (S60), to the sixth terminal device 10f (S62), to the seventh terminal device 10g (S64), and to the fifth terminal device 10e (S66). The processes from S34 to S38 in FIG. 9 and the processes from S60 to S66 in FIG. 10 can be performed substantially simultaneously.

The fifth terminal device 10e calculates the distance (S68), notifies the reception of the emergency signal, the individual ID, the group ID, and the information regarding the position, and causes the fifth camera 20e to start recording (S70). The seventh terminal device 10g calculates the distance (S72) and notifies the reception of the emergency signal, the individual ID, the group ID, and the information regarding the position (S74). The sixth terminal device 10f calculates the distance (S76) and notifies the reception of the emergency signal, the individual ID, and the group ID (S78). The eighth terminal device 10h calculates the distance (S80) and ends the processes.

Figure 11:
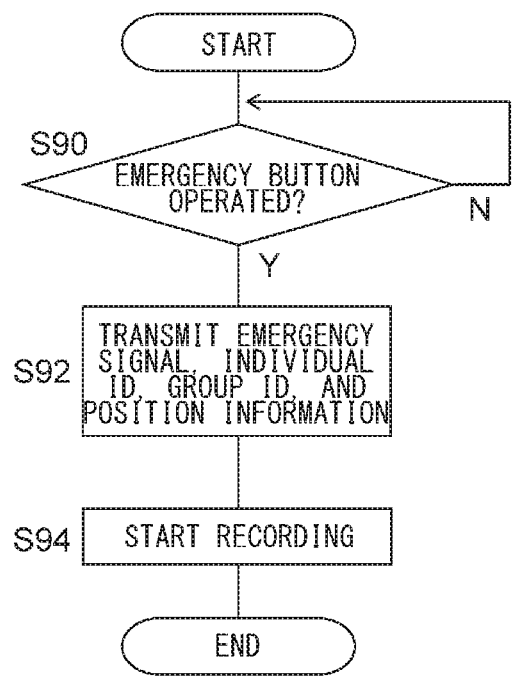
FIG. 11 is a flowchart illustrating an emergency signal transmission process of the terminal devices of FIG. 1.

FIG. 11 is a flowchart illustrating an emergency signal transmission process of the terminal devices 10 of FIG. 1. When the emergency button 16 is operated (Y in S90), the transmitter 42 transmits an emergency signal, the individual ID, the group ID, and the position information (S92). The control unit 38 causes a camera 20 that has been paired to start recording (S94). This process is performed in the first terminal device 10a in FIG. 1. When the emergency button 16 is not operated (N in S90), the terminal device waits for the operation.

Figure 12:
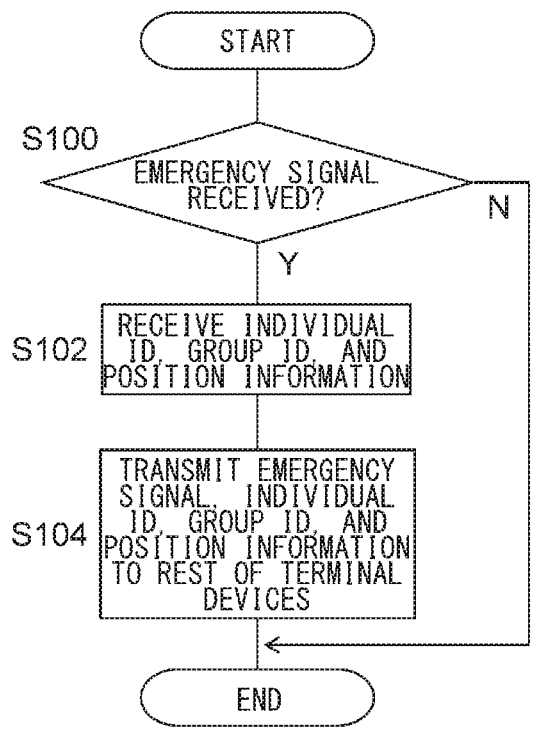
FIG. 12 is a flowchart illustrating an emergency signal reception and transmission process of the base station device of FIG. 1.

FIG. 12 is a flowchart illustrating an emergency signal reception and transmission process of the base station device 80 of FIG. 1. This process is performed on a regular basis. When the receiver 86 has received an emergency signal (Y in S100), the receiver 86 receives the individual ID, the group ID, and the position information (S102). The transmitter 88 transmits the emergency signal, the individual ID, the group ID, and the position information to the rest of the terminal devices 10 of the communication system 200 (S104). When the receiver 86 does not receive the emergency signal (N of S100), the process is ended.

Figure 13:
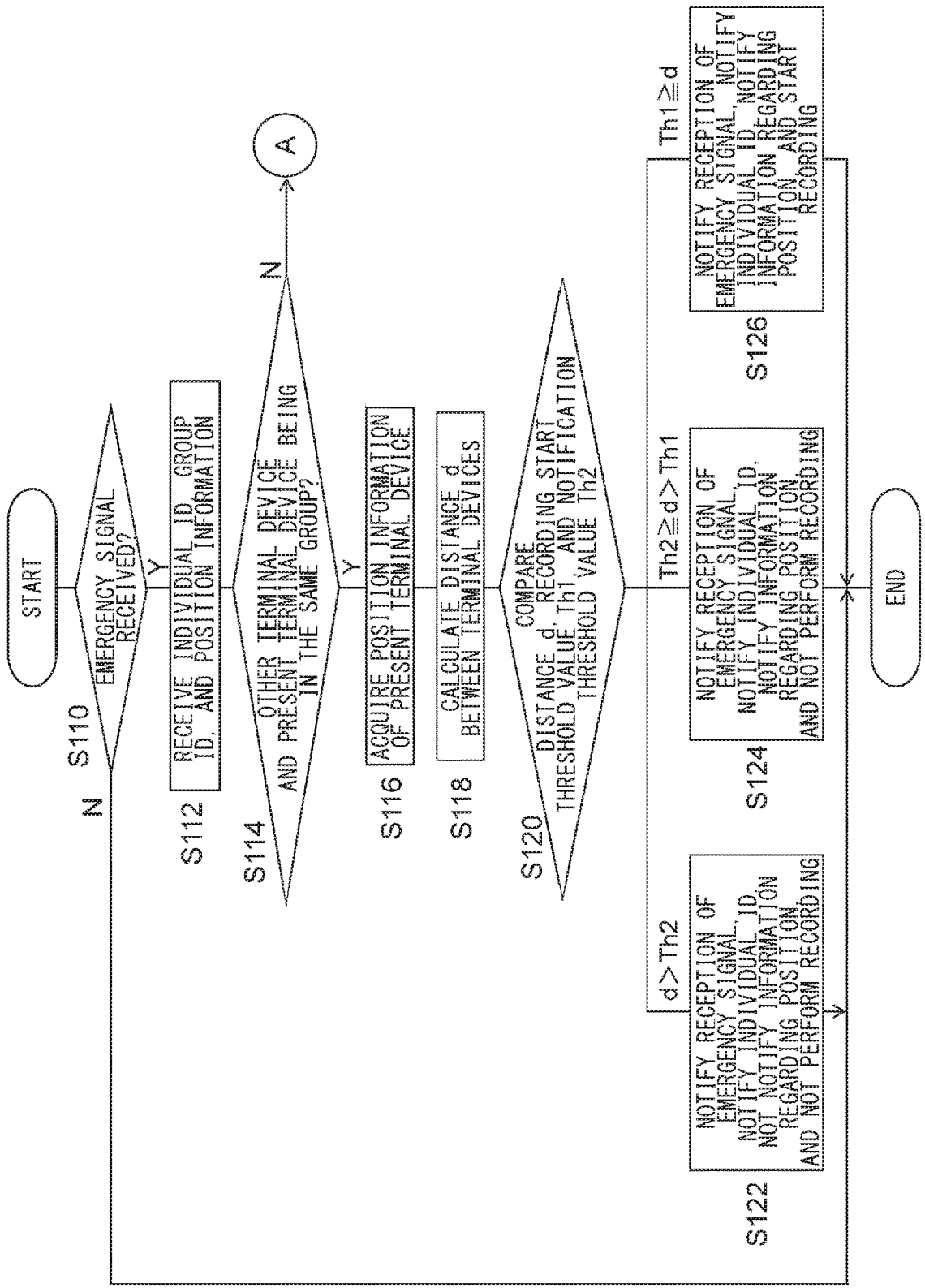
FIG. 13 is a flowchart illustrating an emergency signal reception process of the terminal devices of FIG. 1.

FIG. 13 is a flowchart illustrating an emergency signal reception process of the terminal devices 10 of FIG. 1. The process in FIG. 13 is performed on a regular basis. When the receiver 46 does not receive the emergency signal (N of S110), the process is ended. When the receiver 46 has received an emergency signal (Y in S110), the receiver 46 receives the individual ID of another terminal device 10 that is the transmission source for the emergency signal, the group ID of the other terminal device 10, and the position information of the other terminal device 10 (S112).

When the other terminal device 10 and the present terminal device 10 are in the same group (Y in S114), the positioning unit 40 acquires the position information of the present terminal device 10 (S116). The calculation unit 50 calculates the distance d between the other terminal device 10 and the present terminal device 10 (S118). The comparison unit 54 compares the distance d, the recording start threshold value Th1, and the notification threshold value Th2 with one another (S120).

When the distance d is larger than the notification threshold value Th2, the notification unit 34 notifies the reception of the emergency signal, notifies the individual ID, and does not notify the information regarding the position of the other terminal device 10, and the comparison unit 54 causes the camera 20 not to perform the recording (S122). This process is performed by the fourth terminal device 10d in FIG. 1.

When the distance d is larger than the recording start threshold value Th1 and is less than or equal to the notification threshold value Th2, the notification unit 34 notifies the reception of the emergency signal, notifies the individual ID, and notifies the information regarding the position of the other terminal device 10, and the comparison unit 54 causes the camera 20 not to perform the recording (S124). This process is performed by the third terminal device 10c in FIG. 1.

When the distance d is less than or equal to the recording start threshold value Th1, the notification unit 34 notifies the reception of the emergency signal, notifies the individual ID, and notifies the information regarding the position of the other terminal device 10, and the comparison unit 54 causes the camera 20 to start recording (S126). This process is performed by the second terminal device 10b in FIG. 1.

Figure 14:
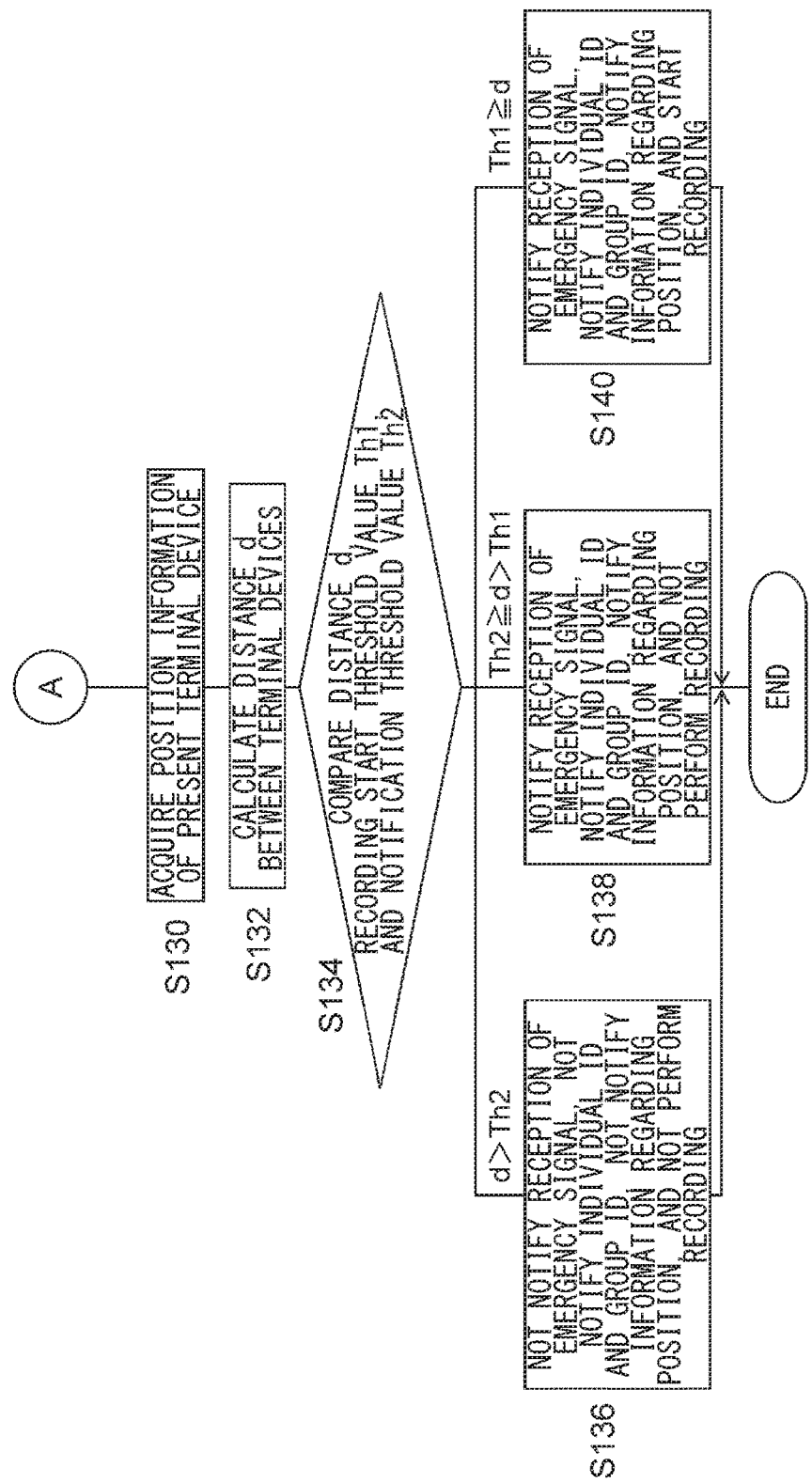
FIG. 14 is a flowchart illustrating an emergency signal reception process of the terminal devices of FIG. 1, following FIG. 13.

On the other hand, when the other terminal device 10 and the present terminal device 10 are not in the same group (N in S114), the process in step S130 in FIG. 14 is performed.

FIG. 14 is a flowchart illustrating an emergency signal reception process of the terminal devices 10 of FIG. 1, following FIG. 13. The positioning unit 40 acquires the position information of the present terminal device 10 (S130). The calculation unit 50 calculates the distance d between the other terminal device 10 and the present terminal device 10 (S132). The comparison unit 54 compares the distance d, the recording start threshold value Th1, and the notification threshold value Th2 with one another (S134).

When the distance d is larger than the notification threshold value Th2, the notification unit 34 does not notify the reception of the emergency signal, does not notify the individual ID and the group ID, and does not notify the information regarding the position of the other terminal device 10, and the comparison unit 54 causes the camera 20 not to perform the recording (S136). This process is performed by the eighth terminal device 10h in FIG. 1.

When the distance d is larger than the recording start threshold value Th1 and is less than or equal to the notification threshold value Th2, the notification unit 34 notifies the reception of the emergency signal, notifies the individual ID and the group ID, and notifies the information regarding the position of the other terminal device 10, and the comparison unit 54 causes the camera 20 not to perform the recording (S138). This process is performed by the sixth terminal device 10f and the seventh terminal device 10g in FIG. 1.

When the distance d is less than or equal to the recording start threshold value Th1, the notification unit 34 notifies the reception of the emergency signal, notifies the individual ID and the group ID, and notifies the information regarding the position of the other terminal device 10, and the comparison unit 54 causes the camera 20 to start recording (S140). This process is performed by the fifth terminal device 10*e* in FIG. 1.

As described, according to the present embodiment, when having received an emergency signal from one terminal device 10 included in one group, the base station device 80 transmits the emergency signal that has been received to the rest of the terminal devices 10 included in the group and to terminal devices 10 other than those in the group; thus, emergency reporting can be made to the terminal devices 10 regardless of their groups. At this time, since the emergency signal is transmitted while maintaining the groups, communication can be performed within the group even when the emergency signal is transmitted. Therefore, in the event of an emergency, emergency reporting can be made to the terminal devices 10 regardless of their groups, and communication can be performed within the group.

Further, since the base station device 80 does not need to perform a process of changing the group or a process of forming a new group when transmitting an emergency signal, emergency reporting can be performed using a simple process.

Also, when the base station device 80 has received, from one terminal device 10, position information indicating the position of this terminal device 10 in addition to an emergency signal, the base station device 80 also transmits this position information to the rest of the terminal devices 10 included in the group and to terminal devices 10 other than those in the group, and the terminal devices 10 that have received the emergency signal can therefore calculate the distance d to the terminal device 10 that is the transmission source for the emergency signal. Therefore, the terminal device 10 that has received the emergency signal can perform a proper process in accordance with the distance d in the event of an emergency.

Also, when the base station device 80 has received, from one terminal device 10, group information of this terminal device 10 in addition to an emergency signal, the base station device 80 also transmits this group information to the rest of the terminal devices 10 included in the group and to terminal devices 10 other than those in the group, and the terminal devices 10 that have received the emergency signal can therefore perform a proper process in accordance with the groups in the event of an emergency.

Also, when the base station device 80 has received, from one terminal device 10, identification information of this terminal device 10 in addition to an emergency signal, the base station device 80 also transmits this identification information to the rest of the terminal devices 10 included in the group and to terminal devices 10 other than those in the group, and the terminal devices 10 that have received the emergency signal can therefore notify the information for identifying the terminal device 10 that is the transmission source for the emergency signal in the event of an emergency.

Further, when the present terminal device 10 receives an emergency signal from another terminal device 10 and the distance d is equal to or less than the recording start threshold value Th1, the present terminal device 10 causes the camera 20 to start recording regardless of the group of the other terminal device 10, and the only camera 20 that is close to the imaging target thus starts recording. Thereby, unnecessary recording, by a camera 20 whose image capturing range does not include a person to be tracked, can be prevented.

Also, if recording is started by a camera 20 of a user who is away from the imaging target and cannot head to help since the user is performing different work based on an order different from that of the user who made the emergency reporting, there is a risk that this user's behavior is disturbed. Since a camera 20 of such a user can be prevented from starting recording, it is possible to prevent the user's behavior from being disturbed. Therefore, in the event of an emergency, it is possible to cause the camera 20 to start recording properly.

Further, when the present terminal device 10 receives an emergency signal from another terminal device 10 and the distance d is equal to or less than the notification threshold value Th2, the present terminal device 10 notifies the user of the present terminal device 10 of information regarding the position of the other terminal device 10 regardless of the group of the other terminal device 10 and is therefore able to indicate the direction toward which the user should go and the direction of the imaging target. Therefore, it is possible to allow the user to act adequately for the emergency reporting. Also, it is possible to prevent a user, who is away from the imaging target and cannot head to help since the user is performing different work based on a different order, from being notified of information regarding the position of another terminal device 10. Thus, unnecessary notification can be suppressed.

When the present terminal device 10 has received an emergency signal from another terminal device 10, the present terminal device 10 notifies information for identifying the other terminal device 10 and the reception of the emergency signal when (1) the group of the other terminal device 10 is the same as the group of the present terminal device 10 or when (2) the group of the other terminal device 10 is different from the group of the present terminal device 10 and the distance d is equal to or less than the notification threshold value Th2. Therefore, in the event of an emergency, notification of the reception of an emergency signal or the like can be made in a terminal device 10 with a high need for notification, and no notification of the reception of an emergency signal or the like can be made in a terminal device 10 with a low need for notification.

Further, in the case where the present terminal device 10 notifies the reception of the emergency signal, if the group of the other terminal device 10 is different from the group of the present terminal device 10, the present terminal device 10 also gives notification of the group of the other terminal device 10; thus, the present terminal device 10 is capable of allowing the user of the present terminal device 10 who has been notified of the reception of the emergency signal to recognize the group of the other terminal device 10, which is the transmission source for the emergency signal. Therefore, the user of the present terminal device 10 who has been notified of the reception of the emergency signal can inform the group of the user having an emergency situation, to the rest of the terminal devices 10 in the group through group communication. Further, even when the information for identifying the other terminal device 10 is the same as the information for identifying any one of the terminal devices 10 in the group of the present terminal device 10, the user can recognize that the other terminal device 10 belongs to a different group.

Further, since the other terminal device 10 also transmits the own position information periodically during the transmission of the emergency signal, even when both the user of the other terminal device 10 and the user of the present terminal device 10 are moving, the user of the present terminal device 10 can adequately approach the user of the other terminal device 10.

Described above is an explanation of the present invention based on the embodiments. The embodiments are intended to be illustrative only, and it will be obvious to those skilled in the art that various modifications to constituting elements and processes could be developed and that such modifications are also within the scope of the present invention.

For example, when the receiver 46 receives the emergency signal, if the group of the other terminal device 10 is different from the group of the present terminal device 10 and the distance d is equal to or less than the recording start threshold value Th1, the notification unit 34 may notify the reception of the emergency signal, the information for identifying the other terminal device 10, and the group of the other terminal device 10. When the receiver 46 has received the emergency signal, if the group of the other terminal device 10 is different from the group of the present terminal device 10 and the distance d is larger than the recording start threshold value Th1, the notification unit 34 may give no notification of the reception of the emergency signal, the information for identifying the other terminal device 10, and the group of the other terminal device 10. This process also corresponds to also giving notification of the group of the other terminal device 10 when the group of the other terminal device 10 is different from the group of the present terminal device 10 in the case where the notification unit 34 gives notification of the reception of the emergency signal. According to this variation, notification can be suppressed for users in a group different from the group of the other terminal device 10 in comparison with the embodiment.

Further, instead of the calculation of the linear distance, the calculation unit 50 may calculate the distance of a path from the present terminal device 10 to the other terminal device 10 based on the position information of the present terminal device 10, the position information of the other terminal device 10, and the map information of the map information storage unit 56. In this variation, the operation of the camera 20 can be controlled based on the distance of a path in which the user actually moves.

Further, instead of the position information of the present terminal device 10 and the position information of the other terminal device 10, the calculation unit 50 may calculate the linear distance between the present terminal device 10 and the other terminal device 10 based on the electric field intensity of the emergency signal received from the other terminal device 10. According to this variation, the degree of freedom in the structure can be improved.

Although an example in which a terminal device 10 includes a positioning unit 40 has been explained, a camera 20 may include a positioning unit, and the positioning unit may supply position information to the terminal device 10. Also, although an example in which information regarding the position of another terminal device 10 is displayed on a display unit 12 of a terminal device 10 has been explained, a camera 20 may include a display unit, and a notification unit 34 may allow the information regarding the position of the other terminal device 10 to be displayed on the display unit of the camera 20 so as to notify the user of the information via the display unit. According to these variations, the degree of freedom in the structure can be improved.

What is claimed is:

1. A terminal device comprising:
   a first communication unit that receives, from one terminal device included in one of a plurality of groups each including a plurality of terminal devices, an emergency signal and group information of the one terminal device;
   a second communication unit that transmits a control signal to a device that is wirelessly connected to a present terminal device;
   a CPU that calculates a distance between the present terminal device and the terminal device that is the transmission source for the emergency signal;
   the CPU that further gives notification, when the first communication unit has received the emergency signal, of the reception of the emergency signal when (1) the group of the terminal device that is the transmission source for the emergency signal is the same as the group of the present terminal device or when (2) the group of the terminal device that is the transmission source for the emergency signal is different from the group of the present terminal device and the distance calculated by the CPU satisfies a predetermined condition,
   wherein when giving notification of the reception of the emergency signal, the CPU also gives notification of the group of the terminal device that is the transmission source for the emergency signal when the group of the terminal device that is the transmission source for the emergency signal is different from the group of the present terminal device; and
   a control unit that controls an operation of the second communication unit in accordance with whether or not the distance satisfies a predetermined condition.

2. A communication system comprising:
   a plurality of terminal devices; and
   a base station device that manages the plurality of terminal devices;
   wherein the terminal station device comprises:
   a first communication unit that receives, from one terminal device included in one of a plurality of groups each including a plurality of terminal devices, an emergency signal and group information of the one terminal device,
   a second communication unit that transmits a control signal to a device that is wirelessly connected to a present terminal device,
   a CPU that calculates a distance between the present terminal device and the terminal device that is the transmission source for the emergency signal; and
   the CPU that further gives notification, when the first communication unit has received the emergency signal, of the reception of the emergency signal when (1) the group of the terminal device that is the transmission source for the emergency signal is the same as the group of the present terminal device or when (2) the group of the terminal device that is the transmission source for the emergency signal is different from the group of the present terminal device and the distance calculated by the CPU satisfies a predetermined condition,
   wherein when giving notification of the reception of the emergency signal, the CPU also gives notification of the group of the terminal device that is the transmission source for the emergency signal when the group of the terminal device that is the transmission source for the emergency signal is different from the group of the present terminal device;

wherein the base station device comprises:
a receiver of the base station device that receives a signal from one terminal device included in one of the plurality of groups, and a transmitter of the base station device that transmits the signal received by the receiver to the rest of the terminal devices included in the group;

wherein when the receiver has received an emergency signal from one terminal device included in one group, the transmitter transmits the emergency signal that has been received by the receiver to the rest of the terminal devices included in the group and terminal devices other than those in the group; and the terminal device having received the emergency signal controls an operation of the second communication unit in accordance with whether or not the distance calculated by the CPU satisfies a predetermined condition.

\* \* \* \* \*